United States Patent
Patel

(10) Patent No.: US 9,018,889 B2
(45) Date of Patent: Apr. 28, 2015

(54) HARDWARE-BASED, REDUNDANT OVERVOLTAGE PROTECTION

(71) Applicant: Hamilton Sundstrand Corporation, Windsor Locks, CT (US)

(72) Inventor: Daxesh K. Patel, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 216 days.

(21) Appl. No.: 13/718,178

(22) Filed: Dec. 18, 2012

(65) Prior Publication Data

US 2014/0168825 A1 Jun. 19, 2014

(51) Int. Cl.
| | |
|---|---|
| *H02P 21/00* | (2006.01) |
| *H02H 7/06* | (2006.01) |
| *H02H 3/05* | (2006.01) |
| *H02P 9/10* | (2006.01) |
| *H02P 9/00* | (2006.01) |

(52) U.S. Cl.
CPC . *H02H 7/06* (2013.01); *H02H 3/05* (2013.01); *H02H 7/065* (2013.01); *H02P 9/102* (2013.01); *H02P 9/006* (2013.01); *H02P 9/10* (2013.01)

(58) Field of Classification Search
USPC ............... 318/805, 807, 810; 361/21; 363/95
See application file for complete search history.

(56) References Cited

U.S. PATENT DOCUMENTS

2012/0106009 A1 5/2012 Beneditz
2012/0293900 A1* 11/2012 Kim et al. ............... 361/86

FOREIGN PATENT DOCUMENTS

| EP | 2482445 A2 | 8/2012 |
| WO | 2008061357 A1 | 5/2008 |

OTHER PUBLICATIONS

European Search Report dated Mar. 7, 2014, for Application 13196266.1.

* cited by examiner

*Primary Examiner* — Karen Masih
(74) *Attorney, Agent, or Firm* — Kinney & Lange, P.A.

(57) ABSTRACT

A generator system includes a generator and a generator control unit (GCU). The GCU is connected to monitor and regulate the generator output voltage. The GCU includes a protection signal processor that receives monitored generator voltages and executes software to detect an overvoltage condition. The GCU further includes redundant, hardware based overvoltage detection that detects a peak voltage value associated with the monitored generator voltage and includes a fast overvoltage detection circuit that generates a first overvoltage fault signal if the peak voltage value is greater than a first threshold value and includes an inverse overvoltage detection circuit that generates a second overvoltage fault signal if the peak voltage value is greater than a second threshold value for a duration of time that varies with a magnitude of the peak voltage value.

15 Claims, 3 Drawing Sheets

HARDWARE-BASED, REDUNDANT OVERVOLTAGE PROTECTION

BACKGROUND

The present invention is related to generator controllers, and in particular to overvoltage protection provided by generator controllers.

Generator controllers, commonly referred to as generator control units (GCUs), regulate the operation of associated generators. For example, in a generator excited by an exciter winding, the GCU monitors the output voltage of the generator and executes software to regulate the output voltage to a desired value. In addition, the GCU executes software to compare the monitored output voltage to a threshold to determine whether an overvoltage fault condition exists that requires the generator to be shut-down. This may include removing excitation from the generator exciter drive, opening contactors connecting the generator output to a distribution system, or other actions.

SUMMARY

A generator system includes a generator and a generator control unit (GCU). The GCU is connected to monitor and regulate the generator output voltage. The GCU includes a protection signal processor that receives monitored generator voltages and executes software to detect an overvoltage condition. The GCU further includes redundant, hardware based overvoltage detection that detects a peak voltage value associated with the monitored generator voltage and includes a fast overvoltage detection circuit that generates a first overvoltage fault signal if the peak voltage value is greater than a first threshold value and includes an inverse overvoltage detection circuit that generates a second overvoltage fault signal if the peak voltage value is greater than a second threshold value for a duration of time that varies with a magnitude of the peak voltage value.

DETAILED DESCRIPTION

Figure 1:
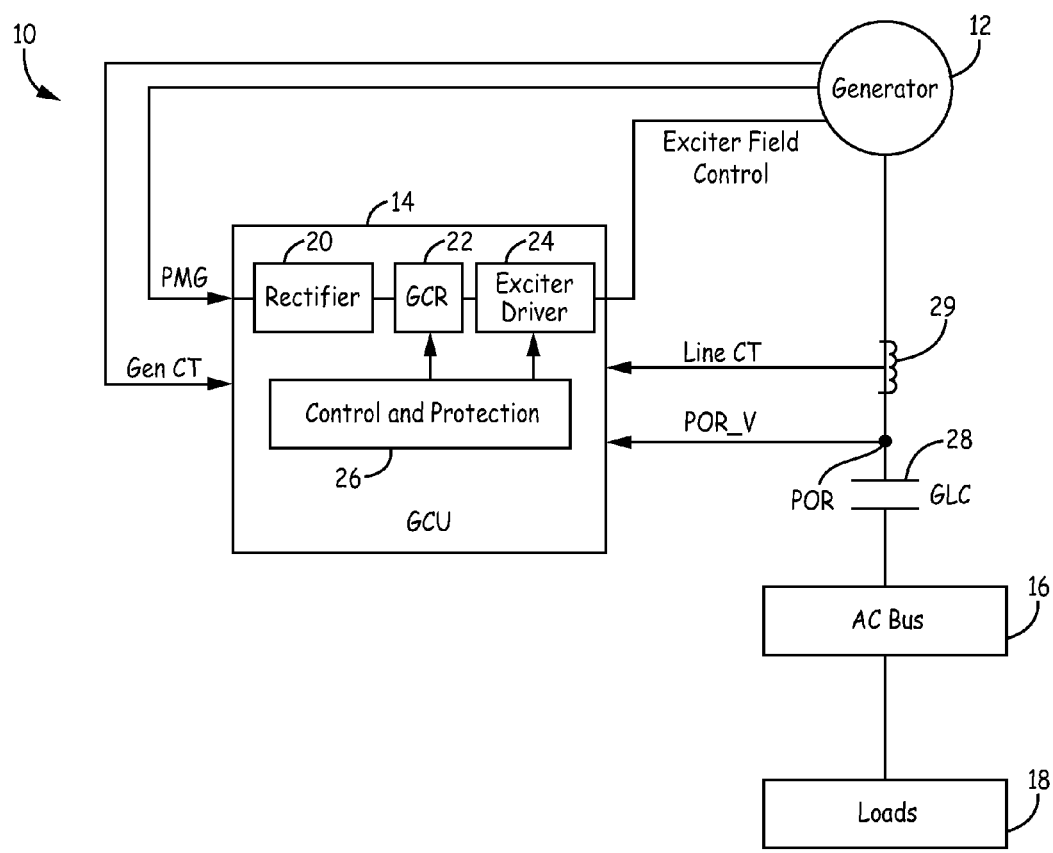
FIG. 1 is a block diagram of a generator system according to an embodiment of the present invention.

FIG. 1 is a block diagram of a generator system 10 according to an embodiment of the present invention. Generator system 10 includes variable frequency generator (VFG) 12, generator control unit (GCU) 14, alternating current (AC) bus 16 and one or more loads 18. Generator control unit (GCU) 14 includes rectifier 20, generator control relay 22, exciter drive 24, and control/protection circuit 26. In the embodiment shown in FIG. 1, generator 12 is a variable frequency wound-field generator, in which the main output of the generator is a function of the current (labeled 'exciter field control') supplied to the exciter field winding (not shown), although in other embodiment VFG 12 may be implemented with other well-known generator types. Throughout this application, VFG 12 is referred to simply as generator 12. In addition, the embodiment shown in FIG. 1, generator 12 includes a permanent magnet generator portion (not shown) that generates an alternating current (AC) voltage labeled PMG_V that is provided to GCU 14 and used to selectively excite the exciter field winding. The main output of generator 12 is provided via AC bus 16 to one or more of a plurality of loads 18. In other embodiments, other types of well-known generator topologies may be employed to excite the wound-field generator and regulate the output of said generator. In the embodiment shown in FIG. 1, as well as those shown in FIGS. 2 and 3, lines indicative of power being transferred are shown in thicker outline, while lines representative of monitored signals or communication signals are shown in thinner outline.

In the embodiment shown in FIG. 1, GCU 14 regulates the output of generator 12. In particular, GCU 14 monitors the main output POR_V of generator 12 at a point of regulation (POR), and selectively controls the excitation (exciter field control) provided to the exciter field winding of generator 12. Excitation for the exciter winding is provided by the AC voltage PMG_V provided by the permanent magnet generator portion of generator 12. The PMG voltage is illustrated with a thicker line to indicate that power is being supplied to GCU 14 from the permanent magnet generator portion. Rectifier 20 rectifies the AC voltage PMG_V and provides a rectified or DC voltage via GCR 22 to exciter drive 24. Control and protection circuit 26, which receives inputs regarding the monitored output voltage POR_V at the point of regulation of generator 12, selectively controls the operation of exciter drive 24 in exciting the field winding. In one embodiment, exciter drive 24 may consist of one or more solid-state switches selectively turned On and Off by control/protection circuit 26 to provide the DC output provided by rectifier 20 to the exciter field winding of generator 12. For example, one embodiment may employ a single solid-state switch for controlling the application of power to the exciter field winding while other embodiments may make use of both a high-side and low-side switch for selectively applying power to the exciter field winding.

In addition to regulation, GCU 14 provides overvoltage protection of generator 12. In particular, control and protection circuit 26 monitors at the output voltage POR_V of generator 12 and in response to the monitored voltage exceeding a threshold voltage acts to protect generator 12. This may include commanding exciter drive 24 to remove excitation provided to generator 12, opening generator control relay (GCR) 22 to remove excitation from being provided to exciter drive 24, and/or opening generator line contactor (GLC) 28 to disconnect generator 12 from AC bus 16. As described in more detail with respect to FIGS. 2 and 3, control and protection circuit 26 provides software-implemented overvoltage protection as well as both fast and slow overvoltage protection implemented in hardware that is redundant to the protection provided in software. In addition, GCU 14 may monitor output current Line_CT associated with generator 12 via current sensor 29.

Figure 2:
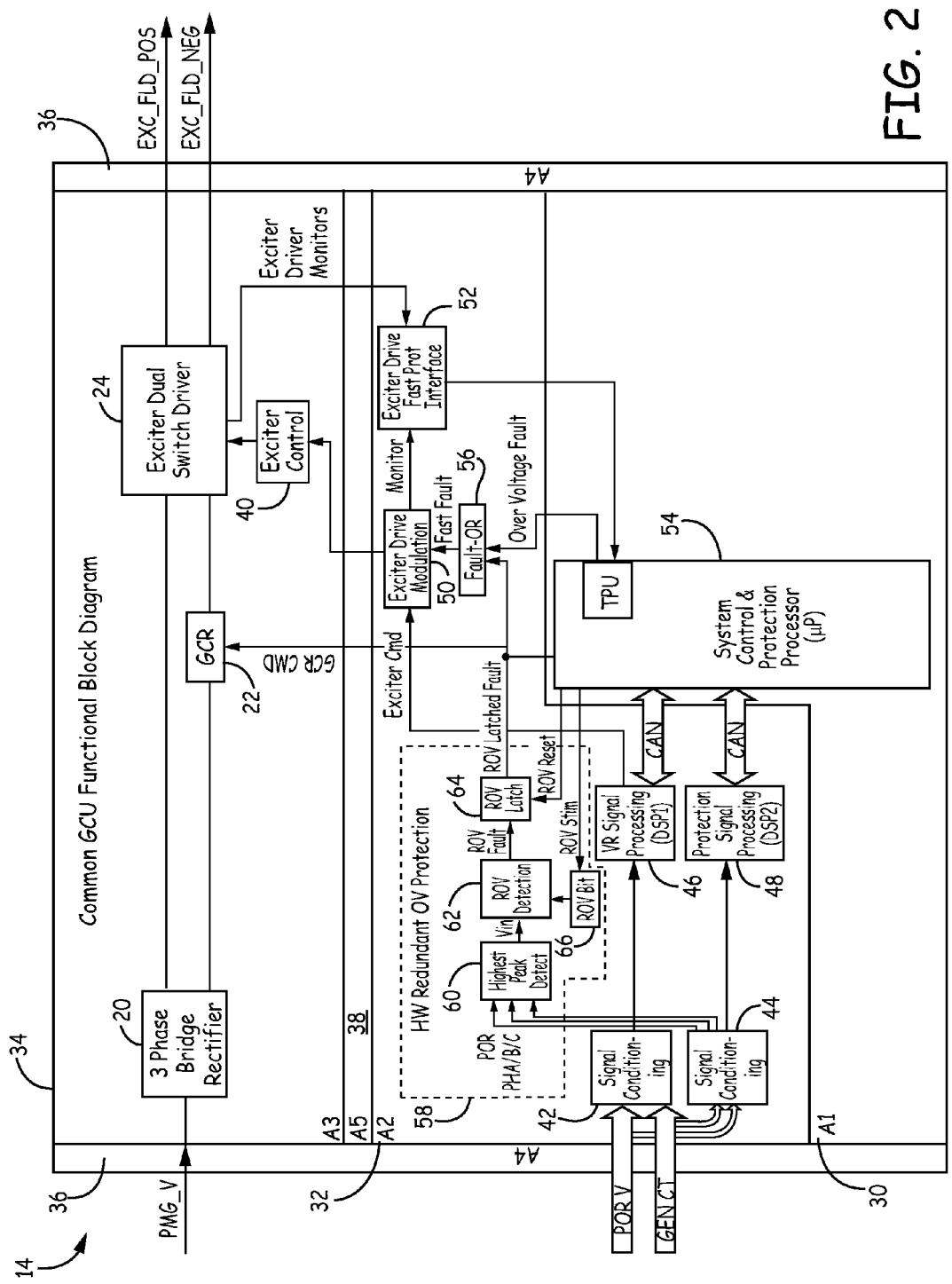
FIG. 2 is a block diagram of a generator controller that provides a combination of software and hardware overvoltage protection according to an embodiment of the present invention.

FIG. 2 is a block diagram of a generator controller unit 14 that illustrates the combination of software and hardware overvoltage protection implemented according to an embodiment of the present invention. As discussed with respect to FIG. 1, GCU 14 monitors the generator output voltage POR_V and through various signal processing steps acts to regulate the generator output voltage by selectively regulating the excitation provided to generator 12 via exciter drive 24 (as shown in FIG. 1). In addition, GCU 14 provides overvoltage protection in response to the monitored generator output voltage POR_V.

In the embodiment shown in FIG. 2, GCU 14 includes a plurality of different modules, including system module 30, signal processing module 32, exciter drive module 34, backplane module 36, and interconnection module 38.

Exciter drive module 34 includes an input for receiving via backplane module 36 the AC voltage generated by the permanent magnet generator (PMG). Exciter drive module 34 includes rectifier 20, generator control relay (GCR) 22, and exciter drive 24, each of which are shown in FIG. 1, as well as exciter control 40. Rectifier 20 rectifies the AC voltage received from PMG armature winding of generator 12 (shown in FIG. 1) to a DC voltage. Exciter drive 24 is selectively turned On and Off based on commands received from exciter control 40 to regulate the current supplied to the exciter winding. A solid-state switch such as a metal-oxide semiconductor field-effect transistor (MOSFET) may be employed by exciter drive 24 to selectively control the application of power to an exciter field winding of generator 12. In addition, GCR 22 is a protective relay used to disconnect power from being supplied to the exciter field winding in the event of an overvoltage condition. In this way, GCR 22 provides overvoltage protection in the event exciter drive 24 fails (e.g., fails closed, preventing regulation of current supplied to the exciter field winding). In the embodiment shown in FIG. 2, GCR 22 is located in series on the negative or return path of the DC voltage provided to exciter drive 24, but in other embodiments could be connected on the positive path.

System module 30 and signal processing module 32 together provide much of the functionality described with respect to control/protection circuit 26 (shown in FIG. 1). In particular, signal processing module 32 receives as inputs the monitored generator current (Gen_CT) and the monitored generator output voltage (PORV) monitored at the point of regulation. The monitored generator current and voltage are conditioned by signal condition circuits 42 and 44, each providing redundant signal conditioning of both the monitored current and voltage. The output of signal conditioning circuit 42 is provided to voltage regulation (VR) signal processor 46, while the output of signal conditioning circuit 44 is provided to protection signal processor 48. In the embodiment shown in FIG. 2, both VR signal processor 46 and protection signal processor 48 are implemented with digital signal processors (DSPs). In response to the monitored generator current and voltage, VR signal processor 46 generates an exciter command signal Exciter_Cmd that is provided to exciter drive modulator 50. Based on the received exciter command signal, exciter drive modulator 50 generates a pulse width modulated signal (PWM) that is provided to exciter control 30, which generates the drive signal supplied to exciter drive 24. In addition, VR signal processor 46 communicates with system control and protection processor 54 regarding the status of the monitored generator outputs and exciter commands. In the embodiment shown in FIG. 2, VR signal processor 46 communicates with system control and protection processor 54 via a controller area network (CAN) bus, although in other embodiments various communication buses and protocols may be employed.

In addition to voltage regulation, signal processing module 62 also provides redundant overvoltage protection. The monitored generator current Gen_CT and the monitored generator output voltage are provided to signal conditioning circuit 44. The conditioned outputs are provided to protection signal processor 48. Based on the monitored generator current and generator output voltage, protection signal processor 48 detects, among other fault conditions, overvoltage conditions. Detected fault conditions such as overvoltage faults are communicated to system control and protection processor 54.

In response to a detected overvoltage condition, system control and protection processor 54 provides a fault signal that is communicated to exciter drive modulation circuit 50 to turn Off or remove the excitation provided to generator 12. In addition, system control and protection processor 54 receives feedback from exciter drive fast protection interface circuit 52, which detects fault conditions in exciter drive circuit 24. In response to a fault condition in exciter drive circuit 24, system control and protection processor 54 generates a fault condition that is provided to exciter drive modulation circuit 50 to remove the excitation provided to generator 12.

The fault conditions monitored and responded to by system control and protection processor 54 are implemented in software. For example, protection signal processor 48 is a digital signal processor that executes software to detect an overvoltage fault condition. Likewise, system control and protection processor 54 is a processor that executes software to respond to inputs provided by protection signal processor 48 and exciter drive fast protection interface 52 to remove excitation provided to generator 12. In contrast to the overvoltage protection provided in software, GCU 14 includes redundant, hardware-based overvoltage protection circuit 58 that includes highest peak detect circuit 60, redundant overvoltage (ROV) detection circuit 62, ROV latch circuit 64, and ROV built-in test circuit 66.

Monitored phase voltages provided to signal conditioning circuit 44 are provided to highest peak detect circuit 60, which identifies a highest peak voltage value from the monitored phase voltages and provides the peak voltage value Vin to ROV detection circuit 62. In response, ROV detection circuit 62 compares the peak voltage value Vin to a reference value Vref. If the peak voltage value Vin is greater than the reference value Vref, then ROV detection circuit 62 generates a fault signal ROV_fault. ROV latch circuit 64 latches the fault signal and provides the latched output indicating a fault to fault-OR circuit 56. ROV latch circuit 64 remains latched until a reset signal is received from system control and protection circuit 54.

In the embodiment shown in FIG. 2, the ROV fault signal provided by ROV latch circuit 64 is combined via a logical OR operation with the fast fault signal provided by system control and protection processor 54. That is, if either the ROV fault signal or the fast fault signal indicate a fault condition, then the output of fault-OR circuit 56 provided to exciter drive modulation circuit 50 indicates a fault condition. In response to an indicated fault condition, exciter drive modulation circuit 50 provides a signal to exciter control circuit 40 with instructions to remove excitation from generator 12. With respect to faults generated by hardware redundant OV protection circuit 58, the fault condition persists until system control and protection processor 54 resets ROV latch 64, thereby clearing the fault. System control and protection processor 54 monitors the ROV fault signal provided by ROV latch circuit 64. In addition, system control and protection processor 54 provides a ROV stim signal to ROV BIT circuit 66 to initiate a built-in test of ROV detection circuit 62. That is, a fault is injected into ROV detection circuit 62, and system control and protection processor 54 monitors the ROV fault signal provided by ROV latch circuit 64 to ensure the fault is handled properly.

In this way, the present invention provides in hardware, overvoltage protection that is redundant to overvoltage protection provided by protection signal processor 48, and as such is not susceptible to software faults. Although hardware overvoltage protection circuit 58 is described throughout as providing redundant fault detection (albeit, implemented in hardware), it should be understood that the thresholds employed by hardware-based overvoltage protection circuit 58 may differ from the thresholds employed by protection signal processor 48. That is, protection signal processor 48 may implement fault detection at a first threshold value, while hardware overvoltage protection circuit 58 implements fault detection at a second threshold value.

Figure 3:
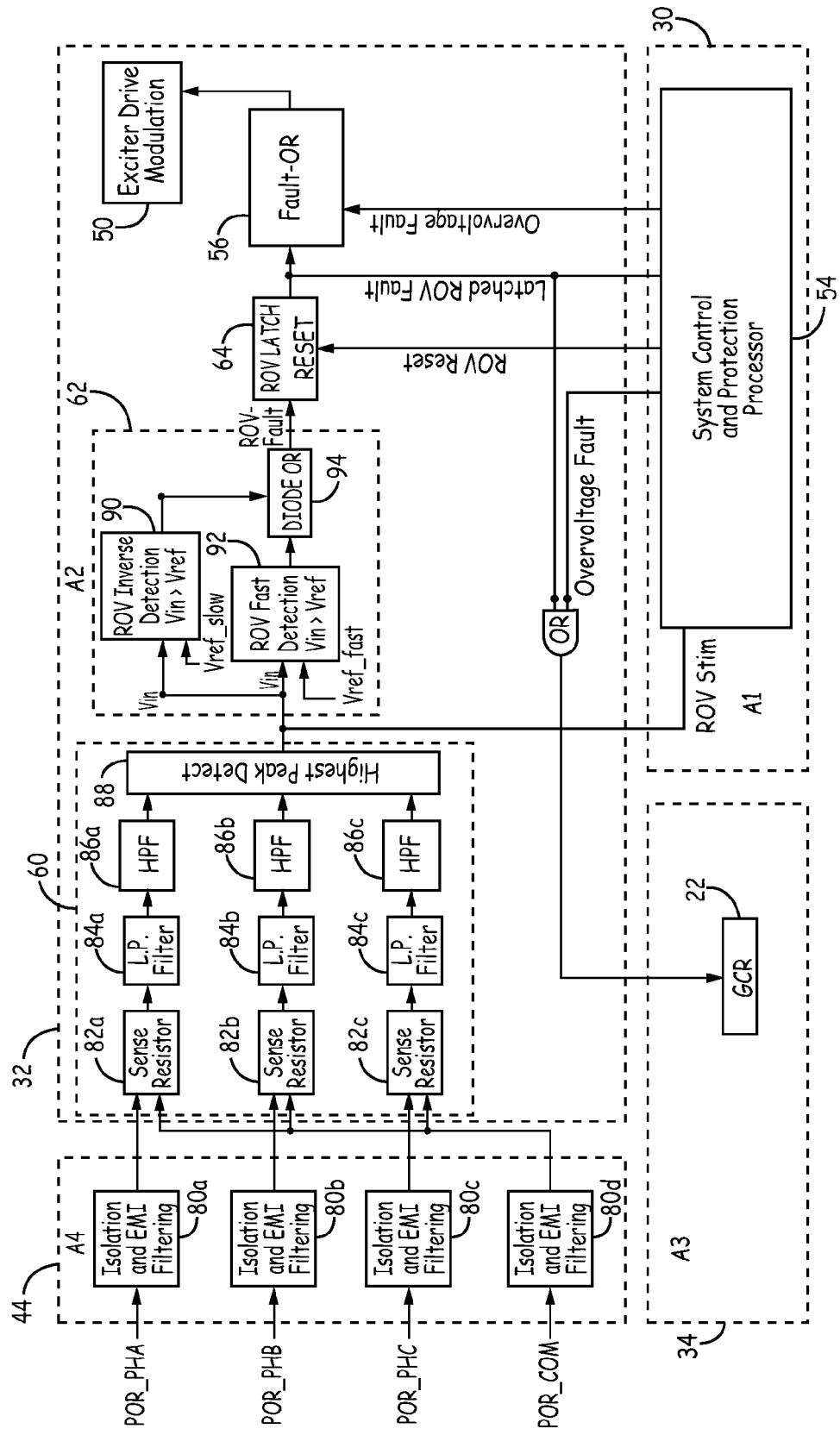
FIG. 3 is a block diagram of a hardware overvoltage protection circuit according to an embodiment of the present invention.

In addition, as discussed in more detail with respect to FIG. 3, hardware overvoltage protection circuit 58 may also implement "fast" and "slow" overvoltage protection. Fast overvoltage protection is implemented by comparing the peak voltage Vin to a reference value Vref_fast (shown in FIG. 3), wherein a fault condition is signaled if the peak voltage Vin is greater than the reference value. "Slow" or "inverse" overvoltage protection is implemented by comparing the peak voltage Vin to a reference value Vref_slow (shown in FIG. 3) and generating a fault signal if the peak voltage Vin is greater than the threshold value for a defined period of time. Because all monitoring is implemented in hardware, a resistive-capacitive (RC) circuit having a specified time constant is used to determine whether a fault signal should be generated.

FIG. 3 is a block diagram illustrating in additional detail components of GCU 14, including in particular hardware overvoltage protection circuit 58 according to an embodiment of the present invention.

Signal conditioning circuit 44 receives output voltages monitored at the POR. In the embodiment shown in FIG. 3, generator 12 provides a three-phase output, wherein each phase is labeled individually here as output voltages POR_PHA, POR_PHB, and POR_PHC. In addition, signal conditioning circuit 44 receives a common or neutral voltage labeled POR_COM to which each phase voltage is compared. Signal conditioning circuit 44 includes isolation and EMI filter circuits 80*a*, 80*b*, 80*c*, and 80*d*, which provide filtering and isolation of the monitored phase voltages provided as inputs to signal conditioning circuit 44.

Sense resistors 82*a*, 82*b*, and 82*c* are connected to measure the voltage associated with each monitored phase voltage relative to the common or neutral voltage POR_COM. That is, sense resistor 82*a* measures the voltage of monitored phase voltage POR_PHA relative to common voltage POR_COM. Likewise, sense resistor 82*b* measures the voltage of monitored phase voltage POR_PHB relative to common voltage POR_COM and sense resistor 82*c* measures the voltage of monitored phase voltage POR_PHB relative to common voltage POR_COM.

Low-pass filter circuits 84*a*, 84*b*, and 84*c* are connected to filter high-frequency noise from the measured voltages provided by sense resistors 82*a*, 82*b*, and 82*c*, respectively, allowing the lower frequency alternating current (AC) frequency of the monitored voltages to pass through the filter circuit. In the embodiment shown in FIG. 3, high-pass filter circuits 86*a*, 86*b*, and 86*c* are connected to remove a DC offset that is added by signal conditioning blocks 42 and 44 to allow the conditioning of AC signals to utilize a zero to three volt range of the analog-to-digital recorder employed in VR signal processor 46 and protection signal processor 48. High-pass filter circuits 86*a*, 86*b*, and 86*c* remove this DC offset. The filtered output of high-pass filter circuits 86*a*, 86*b*, and 86*c* represent the measured phase voltages POR_PHA, POR_PHB, and POR_PHC.

The measured phase voltages are provided to highest peak detector circuit 88, which detects the highest peak associated with each of the three-phases POR_PHA, POR_PHB, and POR_PHC and selects the measured phase voltage that has the highest voltage value. In one embodiment, highest peak detector circuit utilizes the absolute value of the measured phase voltages to determine which one has the highest value. Highest peak detector circuit 88 may compare each of the measured phase voltages to one another to determine which measured phase voltage has the highest value, wherein the selected peak voltage is provided as an output labeled Vin.

The peak voltage value Vin is provided to ROV detection circuit 62, including both ROV inverse detection circuit 90 and ROV fast detection circuit 92. ROV inverse detection circuit 92 triggers a fault when the peak voltage value Vin is greater than a reference voltage Vref_slow for a selected duration of time. In one embodiment, the duration of time is determined by the time constant associated with the resistive-capacitive (RC) network. As the peak voltage value increases, the duration of time required to charge the RC network decreases, resulting in a fault condition being triggered more quickly for a higher peak voltage value. When the peak voltage value Vin exceeds the reference voltage Vref_slow for the selected duration of time, ROV inverse detection circuit 90 generates a fault signal output.

Similarly, ROV fast detection circuit 92 triggers a fault when the peak voltage value Vin is greater than a reference voltage Vref_fast. ROV fast detection circuit 92 provides a faster response than ROV inverse detection circuit 90 by utilizing a much smaller RC time constant value. Thus, the period of time the peak voltage value Vin must be greater than the reference voltage Vref_fast is of a very short duration. Although the reference values utilized by ROV inverse detection circuit 90 and ROV fast detection circuit 92 may be the same, it is more typical for the reference voltage Vref_slow to be less than the reference voltage Vref_fast. When the peak voltage value Vin exceeds the reference voltage Vref_fast, ROV detection circuit 92 generates a fault signal output.

Diode OR circuit 94 provides a fault signal output ROV_fault if either of the fault signal outputs generated by ROV inverse detection circuit 90 or ROV fast detection circuit 92 indicate a fault condition, or if both indicate a fault condition. The output of diode OR circuit 94 is provided to ROV latch circuit 64, which latches the fault condition to maintain the fault condition until reset by a ROV reset command provided by system control and protection processor 54. Fault OR circuit 56 combines fault conditions provided by hardware overvoltage protection circuit 62 with fault conditions provided by system control and protection processor 54. The output of fault OR circuit 56 indicates a fault condition if either hardware overvoltage protection circuit 62 or system control and protection processor 54 indicates a fault condition. In response to a fault signal provided by fault-OR logic 56, exciter drive modulation circuit 50 removes excitation from generator 12.

In addition, in the embodiment shown in FIG. 3, the latched output provided by ROV latch 64 is combined via a logical OR operation with the GCR command provided by system control and protection processor 54 to selectively open GCR 22 (shown in FIGS. 1 and 2) to further ensure de-excitation of generator 12. In this way, in addition to a fault condition detected by hardware overvoltage protection circuit 62 causing exciter drive modulator 50 to de-excite generator 12, the fault condition is also utilized to open GCR 22 to remove DC excitation from the exciter winding.

The following are non-exclusive descriptions of possible embodiments of the present invention. A generator control unit (GCU) is connected to provide independent, redundant overvoltage protection for an associated generator. The GCU includes a protection signal processor, and a hardware-based overvoltage protection circuit. The protection signal processor monitors the output voltage of the generator executes software to detect overvoltage conditions based on the monitored output of the generator and generates a first overvoltage fault signal in response to a detected overvoltage condition. The hardware-based overvoltage protection circuit further includes a peak detector circuit, a fast overvoltage detection circuit, an inverse overvoltage detection circuit, and a diode OR circuit. The peak detector circuit detects a peak voltage associated with the monitored output voltage. The fast overvoltage detection circuit compares the peak voltage to a first threshold value and generates a first fault signal in response to the peak voltage exceeding the first threshold value. The inverse overvoltage detection circuit compares the peak voltage to a second threshold value and generates a second fault signal in response to the peak voltage exceeding the second threshold value for a duration of time. The diode OR circuit logically combines the first fault signal with the second fault signal to generate a second overvoltage fault signal. The first overvoltage fault signal is combined with the second overvoltage fault signal to generate a combined overvoltage fault signal.

The GCU of the preceding paragraph can optionally include, additionally and/or alternatively, any one or more of the following features, configurations and/or additional components. For example, in a further embodiment of the foregoing GCU the first threshold value utilized by the fast overvoltage detection circuit is greater than the second threshold value utilized by the inverse overvoltage detection circuit.

In a further embodiment, the inverse overvoltage detection circuit integrates the peak voltage with the second threshold value to generate the second fault signal.

In a further embodiment, the inverse voltage detection circuit utilizes a resistive-capacitive network having a selected RC time constant to integrate the peak voltage with the second threshold value.

In a further embodiment, the hardware based overvoltage protection circuit includes a latch circuit that latches the second overvoltage fault signal and maintains the second overvoltage fault signal in a latched state until reset.

In a further embodiment, the hardware based overvoltage protection circuit includes a plurality of low-pass filters for filtering high-frequency noise from each phase of the monitored voltage and a plurality of high-pass filters for filtering DC content from each phase of the monitored voltage.

In a further embodiment, the GCU includes an exciter drive, an exciter drive modulator, a voltage regulation processor. The exciter drive is connected to selectively supply excitation current to the generator. The exciter drive modulator provides commands to the exciter drive to turn the exciter drive On and Off. The voltage regulation processor monitors an output voltage of the generator and provides an exciter command to the exciter drive modulator to selectively turn the exciter drive On and Off. In response to a fault condition, the exciter drive modulator prevents the exciter drive from supplying excitation to the generator.

In another embodiment, a generator system includes a generator and a generator control unit (GCU). The generator generates an output voltage that is a function, at least in part, of an exciter current supplied to an excitation winding of the generator. The GCU is connected to monitor and regulate the generator output voltage, wherein the GCU monitors the generator output voltage at a point of regulation (POR) and regulates the exciter current supplied to the excitation winding of the generator and prevents exciter current from being supplied to the excitation winding in response to a detected overvoltage condition. The GCU includes a protection signal processor and a redundant, hardware-based overvoltage detection circuit. The protection signal processor receives monitored generator voltages and executes software to detect an overvoltage condition. The redundant, hardware-based overvoltage detection circuit detects a peak voltage value associated with the monitored generator voltage, and includes a fast overvoltage detection circuit that generates a first overvoltage fault signal if the peak voltage value is greater than a first threshold value and includes an inverse overvoltage detection circuit that generates a second overvoltage fault signal if the peak voltage value is greater than a second threshold value for a duration of time that varies with a magnitude of the peak voltage value.

A further embodiment of the foregoing generator system, wherein the first threshold value utilized by the fast overvoltage detection circuit is greater than the second threshold value utilized by the inverse overvoltage detection circuit.

A further embodiment of the foregoing generator system, wherein the inverse overvoltage detection circuit integrates the peak voltage with the second threshold value to generate the second fault signal.

A further embodiment of the foregoing generator system, wherein the inverse overvoltage detection circuit utilizes a resistive-capacitive network having a selected RC time constant to integrate the peak voltage with the second threshold value.

A further embodiment of the foregoing generator system, wherein the hardware based overvoltage protection circuit includes a latch circuit that latches the second overvoltage fault signal and maintains the second overvoltage fault signal in a latched state until reset.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A generator control unit (GCU) that provides independent, redundant overvoltage protection for an associated generator, the GCU comprising:
   a protection signal processor that monitors an output voltage of the generator at a single point of regulation (POR) and executes software to detect overvoltage conditions based on the monitored output of the generator at the single POR and generates a first overvoltage fault signal in response to a detected overvoltage condition; and
   a hardware-based overvoltage protection circuit that includes:
      a peak detector circuit that detects a peak voltage associated with the monitored output voltage at the single POR;
      a fast overvoltage detection circuit that compares the peak voltage to a first threshold value and generates a first fault signal in response to the peak voltage exceeding the first threshold value;
      an inverse overvoltage detection circuit that compares the peak voltage to a second threshold value and generates a second fault signal in response to the peak voltage exceeding the second threshold value for a duration of time;
      a diode OR circuit that logically combines the first fault signal with the second fault signal to generate a second overvoltage fault signal;
   wherein the first overvoltage fault signal is combined with the second overvoltage fault signal to generate a combined overvoltage fault signal that signals an overvoltage fault condition in the associated generator.

2. The GCU of claim 1, wherein the first threshold value utilized by the fast overvoltage detection circuit is greater than the second threshold value utilized by the inverse overvoltage detection circuit.

3. The GCU of claim 1, wherein the inverse overvoltage detection circuit integrates the peak voltage with the second threshold value to generate the second fault signal.

4. The GCU of claim 3, wherein the inverse overvoltage detection circuit utilizes a resistive-capacitive network having a selected RC time constant to integrate the peak voltage with the second threshold value.

5. The GCU of claim 1, wherein the hardware based overvoltage protection circuit includes:
a latch circuit that latches the second overvoltage fault signal and maintains the second overvoltage fault signal in a latched state until reset.

6. The GCU of claim 1, wherein the hardware based overvoltage protection circuit includes:
a plurality of low-pass filters for filtering high-frequency noise from each phase of the monitored voltage; and
a plurality of high-pass filters for filtering DC content from each phase of the monitored voltage.

7. The GCU of claim 1, wherein the GCU further includes:
an exciter drive that is turned On and Off to supply excitation to the generator; and
an exciter drive modulator that provides commands to the exciter drive to turn the exciter drive On and Off, wherein in response to the combined overvoltage fault signal indicating a fault condition, the exciter drive modulator prevents the exciter drive from supplying excitation to the generator.

8. The GCU of claim 7, wherein the GCU further includes:
a voltage regulation processor that monitors the output voltage of the generator and provides an exciter command to the exciter drive modulator to selectively turn the exciter drive On and Off.

9. A generator system comprising:
a generator that generates a generator output voltage that is a function, at least in part, of an exciter current supplied to an excitation winding of the generator; and
a generator control unit connected to monitor and regulate the generator output voltage, wherein the GCU monitors the generator output voltage at a single point of regulation (POR) and regulates the exciter current supplied to the excitation winding of the generator and prevents exciter current from being supplied to the excitation winding in response to a detected overvoltage condition, wherein the GCU includes a protection signal processor that receives monitored generator voltages at the single POR and executes software to detect an overvoltage condition and further includes redundant, hardware based overvoltage detection that detects a peak voltage value associated with the monitored generator voltage at the single POR, includes a fast overvoltage detection circuit that generates a first overvoltage fault signal if the peak voltage value is greater than a first threshold value and includes an inverse overvoltage detection circuit that generates a second overvoltage fault signal if the peak voltage value is greater than a second threshold value for a duration of time that varies with a magnitude of the peak voltage value, wherein the hardware-based overvoltage detection circuit detects an overvoltage condition based on either the first overvoltage fault signal or the second overvoltage fault signal being true.

10. The generator system of claim 9, wherein the first threshold value utilized by the fast overvoltage detection circuit is greater than the second threshold value utilized by the inverse overvoltage detection circuit.

11. The generator system of claim 9, wherein the inverse overvoltage detection circuit integrates the peak voltage with the second threshold value to generate the second fault signal.

12. The generator system of claim 11, wherein the inverse overvoltage detection circuit utilizes a resistive-capacitive network having a selected RC time constant to integrate the peak voltage with the second threshold value.

13. The generator system of claim 9, wherein the hardware based overvoltage protection circuit includes:
a latch circuit that latches the second overvoltage fault signal and maintains the second overvoltage fault signal in a latched state until reset.

14. A generator control unit (GCU) that provides independent, redundant overvoltage protection for an associated generator, the GCU comprising:
a protection signal processor that monitors an output voltage of the generator and executes software to detect overvoltage conditions based on the monitored output of the generator and generates a first overvoltage fault signal in response to a detected overvoltage condition;
a hardware-based overvoltage protection circuit that includes:
a peak detector circuit that detects a peak voltage associated with the monitored output voltage;
a fast overvoltage detection circuit that compares the peak voltage to a first threshold value and generates a first fault signal in response to the peak voltage exceeding the first threshold value;
an inverse overvoltage detection circuit that compares the peak voltage to a second threshold value and generates a second fault signal in response to the peak voltage exceeding the second threshold value for a duration of time;
a diode OR circuit that logically combines the first fault signal with the second fault signal to generate a second overvoltage fault signal;
wherein the first overvoltage fault signal is combined with the second overvoltage fault signal to generate a combined overvoltage fault signal that signals an overvoltage fault condition in the associated generator; and
wherein the inverse overvoltage detection circuit integrates the peak voltage with the second threshold value to generate the second fault signal.

15. The GCU of claim 14, wherein the inverse overvoltage detection circuit utilizes a resistive-capacitive network having a selected RC time constant to integrate the peak voltage with the second threshold value.

* * * * *